(12) United States Patent
Chartier et al.

(10) Patent No.: US 11,892,348 B2
(45) Date of Patent: Feb. 6, 2024

(54) STIFFENING SYSTEM OF TIE RODS FOR STIFFENING A STRUCTURE COMPRISING AN ACTUATOR TO DEFORM A DEFORMABLE LINKING ELEMENT

(71) Applicant: NEXANS, Courbevoie (FR)

(72) Inventors: Emilie Chartier, Aix en Provence (FR); Jérémy Amar, Les Miles (FR); Morgan Printemps, Ciotat (FR); Ludovic Quevillier, Aubagne (FR); Aymeric Richard, Venelles (FR); Lucas Gillet, Saint Zacharie (FR); Emile Soulie, Meyragues (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/986,662

(22) Filed: Nov. 14, 2022

(65) Prior Publication Data
US 2023/0184584 A1 Jun. 15, 2023

(30) Foreign Application Priority Data

Nov. 16, 2021 (FR) ...................................... 2112112

(51) Int. Cl.
*F16B 7/04* (2006.01)
*G01J 1/04* (2006.01)
*E04C 3/08* (2006.01)
*E04C 3/04* (2006.01)
*G01J 1/42* (2006.01)

(52) U.S. Cl.
CPC .............. *G01J 1/0403* (2013.01); *E04C 3/08* (2013.01); *F16B 7/0406* (2013.01); *E04C 2003/0495* (2013.01); *G01J 2001/4266* (2013.01)

(58) Field of Classification Search
CPC .......... E05B 79/10; E05B 79/14; E05B 79/16; E05B 79/20; E04B 2/00; E04G 5/04; F16B 1/00; F16B 7/04; F16B 9/02; F16B 9/09; F16B 7/00; E04C 3/00; E04C 3/08; G01J 1/04
USPC ...................................... 250/239, 221, 203.4
See application file for complete search history.

(56) References Cited

U.S. PATENT DOCUMENTS

| | | | |
|---|---|---|---|
| 8,844,213 B2 * | 9/2014 | Posnansky | H02S 20/25 52/173.3 |
| 2019/0190442 A1 | 6/2019 | Tordo | |

FOREIGN PATENT DOCUMENTS

WO 2014/088369 6/2014

OTHER PUBLICATIONS

International Search Report dated Jul. 6, 2022.

* cited by examiner

*Primary Examiner* — Que Tan Le
(74) *Attorney, Agent, or Firm* — Sofer & Haroun, LLP

(57) ABSTRACT

A system for stiffening a structure has at least one pair of tie rods (3), each tie rod (3) of the pair of tie rods (3) having a first end (4) fastened to the structure (2) and a second end (5), and at least one device (6) for tensioning the tie rods (3) having a deformable linking element (7) fastened to the second end (5) of each tie rod (3) so as to connect the tie rods (3). An actuator (10) is configured to deform the linking element (7) so as to make it pass from an inactive configuration in which the tie rods (3) are in a first state of tension to an active configuration in which the tie rods (3) are in a second state of tension, different than the first state of tension.

22 Claims, 8 Drawing Sheets

STIFFENING SYSTEM OF TIE RODS FOR STIFFENING A STRUCTURE COMPRISING AN ACTUATOR TO DEFORM A DEFORMABLE LINKING ELEMENT

RELATED APPLICATION

This application claims the benefit of priority from French Patent Application No. 21 12112, filed on Nov. 16, 2021, the entirety of which is incorporated by reference.

FIELD OF THE INVENTION

The present invention relates generally to the tensioning of rigid tie rods on structures, and more particularly to a system for stiffening a structure, to a method for stiffening a structure with the aid of said system, to a lattice structure having said system and to a solar tracker having said structure.

BACKGROUND

In many structures, in particular metal lattice structures, tie rods are used to stiffen the assembly.

It is known practice to use tie rods welded in lattice beams, in particular for the manufacture of gantries. However, it is not possible to tension such welded tie rods so as to obtain prestressed tie rods.

One known solution is the use of tie rods which can be tensioned by way of turnbuckles. Such a device typically has a first tie rod having a fixed end and an end provided with a right-hand screw thread, a second tie rod having a fixed end and an end provided with a left-hand screw thread, and a central sleeve onto which the threaded ends of the first and second tie rods are screwed. The rotation of the central sleeve thus brings about the tensioning of the first and second tie rods.

The document WO 2018/033495, in the name of the Applicant, describes a lattice structure having tie rods, said lattice structure serving as a support structure for a table of a solar tracker. However, the constituent elements of the structure to which the tie rods are fastened are manufactured with manufacturing tolerances, thus making the distance between the fastening points of the tie rods on the structure vary substantially. These tolerance differences cannot be compensated by introducing play at the fastening points, the risk of buckling of the tie rods becoming high under these circumstances. In order to avoid the buckling of the tie rods, the latter need to be fastened preferably with a slight tensile preload. The use of a thread/nut system at the end of the tie rod makes it possible to solve this problem. However, this solution proves to be expensive and requires significant assembly time.

The document WO 2021/009425, in the name of the Applicant, describes a tie rod that is able to be fastened at two fastening points of a structure by means of two fastening screws, said tie rod having a longitudinal body provided with a first fastening end comprising a first circular opening and with a second fastening end comprising a second circular opening. Said tie rod has a washer comprising a cylindrical external envelope body and provided with an off-center through-orifice, said washer being received concentrically in the second circular opening and being rotatable in said second circular opening so as to modify the position of the off-center orifice in order to vary a center-to-center fastening distance between said off-center orifice and the first circular opening. The use of such an off-center washer makes it possible ensure both the fastening of the tie rod to the structure and the compensation for the above-mentioned tolerance differences. Specifically, the application of a tightening torque to the off-center washer makes it possible to tension the tie rod. However, it proves difficult to measure the tension applied to the tie rod with such a solution, without considering the significant time necessary for setting the tensioning of the tie rod.

OBJECTS AND SUMMARY

It is an aim of the present invention to improve the systems for tensioning tie rods, in particular the one described in the document WO 2021/009425, and in particular to better control or precisely measure the tension applied to the tie rods and reduce the time necessary for tensioning the tie rods, in order to respond to the problem of compensating for tolerance differences and mechanically reinforce the structure, in particular with regard to bending and/or twisting deformations.

To this end, according to a first aspect, a subject of the present invention is a system for stiffening a structure, having:
- at least one pair of tie rods, in particular at least two pairs of tie rods, each tie rod of the pair or pairs of tie rods having a first end fastened to the structure and a second end,
- at least one device for tensioning the tie rods, having:
  - a deformable linking element fastened to the second end of each tie rod so as to connect the tie rods,
  - an actuator configured to deform the linking element so as to make it pass from an inactive configuration in which the tie rods are in a first state of tension to an active configuration in which the tie rods are in a second state of tension, different than the first state of tension.

Thus, the linking element is in said inactive configured prior to deformation by the actuator and in said active configuration following deformation by the actuator.

The deformation of the linking element allows the tie rods to pass from a first state of tension to a second state of tension, different than the first. It is thus possible to modify the tension in the tie rods in a simple and reproducible manner.

Preferably, the second state of tension corresponds to a state of tensile loading of the tie rods.

Preferably, the tensile load in the tie rods is greater in the second state of tension than in the first state of tension. Thus, the system according to the invention can allow the tensile loading of the tie rods by deformation of the linking element (i.e. passage from the inactive configuration to the active configuration), so as to mechanically reinforce the structure.

The first state of tension may correspond to a state in which no tension is applied to the tie rods or a state of slight compressive loading of the tie rods.

This state of slight compressive loading of the tie rods may cause the tie rods to buckle.

This first state of tension may make it easier to mount the tie rods on the structure and the linking element.

The second state of tension may be predetermined. This means that the second state of tension may correspond to a predetermined value of tensile loading of the tie rods, in particular sufficient for mechanically reinforcing the structure. Thus, the system according to the invention may make it possible to measure the tensile load applied to the tie rods.

Preferably, one of the tie rods of the pair of tie rods is fastened by its second end at a first fastening point of the linking element, and the other tie rod of the pair of tie rods is fastened by its second end at a second fastening point of the linking element.

The deformation of the linking element as it passes from the inactive configuration to the active configuration preferably shortens the distance between the first and second fastening points of the linking element, this distance being measured along a straight line passing through the first and second fastening points of the linking element. Such a deformation of the linking element makes it possible to apply a tensile force to each tie rod of the pair of tie rods.

The linking element may be plastically deformable and the actuator may be configured to plastically deform the linking element.

The linking element may be elastically deformable and the actuator may be configured to elastically deform the linking element.

The actuator may be configured to apply stress to the linking element to deform it and thus make it pass from the inactive configuration to the active configuration. In this case, the linking element may be plastically or elastically deformable.

The actuator may also be configured to relieve the stress applied to the linking element in order to allow it to return into its initial state, i.e. prior to deformation, and thus make it pass from the active configuration to the inactive configuration. In this case, the linking element is preferably elastically deformable and the actuator is preferably configured to elastically deform the linking element.

The stress applied by the actuator to the linking element may be tightening of the linking element, in particular against the actuator.

The linking element may be made from any type of material that is deformable by the actuator.

The linking element is made for example from a metal material, preferably from steel or stainless steel.

The thickness of the linking element may be between 2 and 4 mm.

Preferably, the material and/or the thickness of the linking element are chosen so as to give the linking element sufficient ductility to allow it to be deformed without breaking.

The linking element extends preferably in a first plane and is deformable in a second plane, perpendicular to the first plane.

Each tie rod of the pair or pairs of tie rods extends preferably in the same plane as the linking element (i.e. the first plane) or in a parallel plane.

The tie rods of the pair or of each pair of tie rods may lie in the continuation of one another.

The tie rods of the pair or of each pair of tie rods are preferably aligned.

Each tie rod of the pair or pairs of tie rods is preferably rigid.

Each tie rod of the pair or pairs of tie rods may be made from a metal material, for example from steel or stainless steel.

Each tie rod of the pair or pairs of tie rods may have a body, for example a rigid metal bar, extending along the longitudinal axis of the tie rod, said body being provided with said first end which is fastened to the structure and with said second end which is fastened to the linking element.

The linking element may have a pair of arms, the arms having in particular proximal ends connected to the center of the linking element and distal ends having the fastening points.

The arms of the pair of arms of the linking element may lie in the continuation of one another.

The arms of the pair of arms of the linking element are preferably aligned.

Each arm of the pair of arms of the linking element may be a plate, having in particular a triangular overall shape, with for example a tip of the triangle as the proximal end of the arm connected to said center of the linking element and a side opposite to said tip as the distal end of the arm having said fastening point.

The system may have at least two pairs of tie rods, each tie rod having preferably a first end fastened to the structure and a second end fastened to the linking element.

It is particularly advantageous to have at least two pairs of tie rods in the system since each tie rod is fastened to one and the same deformable linking element. Thus, the deformation of the linking element may make it possible to simultaneously and uniformly modify the state of tension in the set of tie rods, and in particular to simultaneously and uniformly tension the set of tie rods. Moreover, a single operation, i.e. the deformation of the linking element, makes it possible to act on the set of tie rods. The system according to the present invention thus makes it possible to stiffen the structure in a simple manner, in less time, and with the tension applied in the set of tie rods being precisely controlled.

When the system has two pairs of tie rods, the tie rods are preferably disposed in a star shape around the linking element.

The linking element preferably has a number of arms equal to the number of tie rods of the system. Each arm may have a fastening point such that the linking element has a number of fastening points equal to the number of tie rods of the system. This allows each tie rod to be fastened to the linking element by its second end.

For example, when the system has two pairs of tie rods, the linking element has two pairs of arms, which are preferably disposed in a star shape around the center of the linking element.

By way of example, the system may have three or four pairs of tie rods, each tie rod having preferably a first end fastened to the structure and a second end fastened to the linking element.

The actuator may be actuated by a motor or manually.

The actuator may be configured to deform the linking element by tightening the linking element against the actuator.

The tightening may be effected by screwing or any other appropriate means.

The actuator may have a tightening support and in particular be configured to deform the linking element by tightening the linking element in contact with the tightening support.

This may make it possible to deform the linking element in a controlled manner by controlling the tightening force applied to the linking element. It is, for example, possible to apply a predetermined tightening force so as to achieve a second predetermined state of tension.

The use of the tightening support may allow the linking element to deform while conforming to the shape of the tightening support. Such a tightening support may thus make it possible to deform the linking element in a guided manner with respect to the tightening support.

The tightening support preferably has sufficient stiffness not to deform when a tightening force is applied to the linking element so as to deform it.

The tightening torque applied by the actuator is preferably predetermined.

The tightening support may be in the form of a plate having a concavity at its center.

The apex of the concavity may have an orifice.

The linking element may have an orifice at its center.

The tightening support may be configured to be superposed on the linking element, preferably such that the concavity of the tightening support is oriented toward the linking element and such that the orifice in the tightening support is situated next to the orifice in the linking element.

Preferably, the surface of the tightening support facing the linking element does not have a sharp edge. This makes it possible to limit or even eliminate the risk of the linking element breaking while it is deformed.

The actuator may also have a tightening-screw/nut assembly, and the orifices in the tightening support and in the linking element that lie next to one another are preferably intended to receive said tightening-screw/nut assembly.

During the tightening of the tightening-screw/nut assembly, the linking element deforms, conforming to the shape of the concavity of the tightening support.

The nut may come to bear against the linking element.

Advantageously, the actuator may also be configured to make the linking element pass from the active configuration in which the tie rods are in the second state of tension to the inactive configuration in which the tie rods are in the first state of tension.

This may allow the linking element to return into its inactive configuration, i.e. its configuration prior to deformation.

When the tensile load in the tie rods is greater in the second state of tension than in the first state of tension, the actuator can then make it possible to place the tie rods under tensile loading (i.e. the linking element passes from the inactive configuration to the active configuration) in order to stiffen the structure, but also to reduce the tensile load in the tie rods (i.e. the linking element passes from the active configuration to the inactive configuration) in order, for example, to make it easier to disassemble the structure.

For example, the linking element is elastically deformable and the actuator is configured to elastically deform the linking element by applying stress to the linking element so as to make it pass from the inactive configuration to the active configuration. In this example, the actuator is also configured to relieve the stress applied to the linking element in order to allow it to return into its initial state, i.e. prior to deformation, and thus make it pass from the active configuration to the inactive configuration. In this example, the linking element may return into the inactive configuration, simply by relieving the stress applied by the actuator on the linking element, since the deformation undergone by the linking element while it passes from the inactive configuration to the active configuration is reversible, i.e. not permanent.

The structure may be a supporting structure, in particular a lattice structure.

The supporting structure may be metallic.

The supporting structure is for example a lattice beam, in particular a rigid lattice beam.

The supporting structure may have longitudinal members and crossmembers.

In a preferred embodiment, the supporting structure has at least two longitudinal members extending parallel to one another along a main direction of extension and at least two crossmembers for mechanically connecting the longitudinal members together, and the stiffening system according to the invention has two pairs of tie rods. The tie rods are disposed in a star shape around the linking element. Each tie rod has a first end fastened to one of the longitudinal members and to one of the crossmembers, and a second end fastened to the linking element. The tie rods are arranged so as to connect the longitudinal members together and the crossmembers together.

A further subject of the present invention is a method for stiffening a structure with the aid of a system as defined above, wherein a predetermined deformation force is applied to the linking element with the aid of the actuator so as to deform the linking element in a controlled manner and thus to make it pass from an inactive configuration in which the tie rods are in a first state of tension to an active configuration in which the tie rods are in a second predetermined state of tension, different than the first state of tension.

Preferably, the second predetermined state of tension corresponds to a state of tensile loading of the tie rods.

Preferably, the tensile load in the tie rods is greater in the second state of tension than in the first state of tension.

The deformation force to be applied to the linking element in order to deform it and thus make it pass from the inactive configuration to the active configuration is dependent in particular on the second state of tension to be achieved and on the stiffness of the linking element.

The second state of tension to be achieved may depend on the length of the structure, in particular of the lattice beam, to be stiffened.

A further subject of the present invention is a lattice structure having:
- at least two longitudinal members extending parallel to one another along a main direction of extension,
- a plurality of crossmembers distributed along the main direction of extension in order to connect the longitudinal members together,
- a plurality of tie rods disposed so as to connect the adjacent crossmembers together,
- at least two adjacent crossmembers having, between one another, a stiffening system as defined above.

The lattice structure may be a lattice beam, in particular a rigid lattice beam.

The lattice structure may be metallic.

Preferably, the stiffening system between two adjacent crossmembers has two pairs of tie rods.

Preferably, the crossmembers are parallel to one another.

Preferably, the structure forms a quadrilateral between two adjacent crossmembers. The quadrilateral may have two opposite sides corresponding to two adjacent crossmembers and two opposite sides corresponding to the portions of longitudinal members extending between said adjacent crossmembers.

Preferably, the tie rods connecting two adjacent crossmembers extend along the direction of the diagonals of the quadrilateral.

Thus, the structure may have a plurality of quadrilaterals distributed along the main direction of extension, each quadrilateral having tie rods which extend preferably along the diagonals of the quadrilateral.

Preferably, the crossmembers extend in a direction perpendicular to the main direction of extension. Thus, the structure may have a plurality of squares or rectangles distributed along the main direction of extension, each square or rectangle having tie rods which extend preferably along the diagonals of the square or rectangle.

Preferably, at least some crossmembers are movable in translation in both directions along the main direction of extension with respect to the longitudinal members and at least some crossmembers are fixed with respect to the longitudinal members.

The movable crossmembers are preferably fastened to the longitudinal members by fastening systems such as, for example, screw/nut systems received in oblong holes provided in the longitudinal members. These oblong holes, and in particular appropriate tightening of the screw/nut systems, allow the movement of the movable crossmembers in translation along the main direction of extension.

The fixed crossmembers are preferably fastened to the longitudinal members by fastening systems such as, for example, screw/nut systems or rivets received in circular holes provided in the longitudinal members. These circular holes do not allow the crossmembers to move with respect to the longitudinal members.

The lattice structure may be supported by at least two support arches. For example, the lattice structure, and in particular the longitudinal members of the lattice structure, are fastened to the ends of the support arches.

Preferably, the lattice structure has fixed crossmembers at its ends and in the fastening zone of the arches. Thus, the lattice structure may have at least four fixed crossmembers.

The lattice structure preferably has, between two adjacent fixed crossmembers, at least one quadrilateral having the stiffening system as defined above, preferably centered with respect to the two adjacent fixed crossmembers.

The lattice structure preferably has, between two adjacent fixed crossmembers that are situated at one end of the structure and in the fastening zone of an arch, a quadrilateral having the stiffening system as defined above.

The lattice structure preferably has, between two adjacent fixed crossmembers that are situated in the fastening zones of the arches, one, two or three quadrilaterals having the stiffening system as defined above.

The tensioning of the tie rods of the quadrilaterals having the stiffening system as defined above makes it possible to drive the movable crossmembers in translation along the main direction of extension and thus makes it possible to stiffen the lattice structure as a whole.

Thus, the lattice structure according to the invention is particularly advantageous since it can be stiffened as a whole by tensioning only the tie rods of the quadrilaterals having the stiffening system as defined above. It is thus no longer necessary to tension the tie rods of each quadrilateral of the structure one by one. This makes it possible to significantly reduce the assembly time by reducing the number of tie rod tensioning operations.

Moreover, the use in some quadrilaterals of the structure of the stiffening system as defined above with two pairs of tie rods makes it possible to tension the two pairs of tie rods at the same time, thereby making it possible to limit possible bracing of the movable crossmembers.

After the structure has been stiffened as a whole, the tightening of the fastening, in particular screw/nut, systems of the movable crossmembers on the longitudinal members is continued so that these movable crossmembers can no longer move in translation along the main direction of extension.

The lattice structure may have two, three or four longitudinal members extending parallel to one another along a main direction of extension. The adjacent longitudinal members may be connected in pairs by crossmembers as described above. The adjacent crossmembers connecting two adjacent longitudinal members may be connected together by tie rods as described above.

A further subject of the present invention is a solar tracker having:

- at least one lattice structure as defined above, in particular a lattice beam, extending longitudinally along a main direction of extension,
- at least one table supported by the lattice structure, the table being equipped with at least one device for collecting solar energy, the table extending longitudinally along the main direction of extension,
- at least two support arches that are rotatable about an axis of rotation extending along the main direction of extension, the arches being mounted on the lattice structure so as to drive the lattice structure in rotation about the axis of rotation of the arches.

The table is preferably equipped with a plurality of solar panels in one and the same plane.

The lattice structure is preferably sufficiently rigid to support the table.

The support arches preferably support the lattice structure.

The solar tracker may also have a drive system configured to drive the arches in rotation about the axis of rotation of the arches.

A further subject of the present invention is a solar field having a plurality of solar trackers as defined above.

At least some solar trackers may be disposed parallel to one another, in particular along the North/South direction.

A further subject of the present invention is a lattice structure having:

- at least two longitudinal members extending parallel to one another along a main direction of extension,
- a plurality of crossmembers distributed along the main direction of extension in order to connect the longitudinal members together,
- a plurality of tie rods disposed so as to connect the adjacent crossmembers together,
- at least some crossmembers being movable in translation in both directions along the main direction of extension with respect to the longitudinal members and at least some crossmembers being fixed with respect to the longitudinal members.

The lattice structure may be a lattice beam, in particular a rigid lattice beam.

The lattice structure may be metallic.

Preferably, the crossmembers are parallel to one another.

Preferably, the structure forms a quadrilateral between two adjacent crossmembers. The quadrilateral may have two opposite sides corresponding to two adjacent crossmembers and two opposite sides corresponding to the portions of longitudinal members extending between said adjacent crossmembers.

Preferably, the tie rods connecting two adjacent crossmembers extend along the direction of the diagonals of the quadrilateral.

Thus, the structure may have a plurality of quadrilaterals distributed along the main direction of extension, each quadrilateral having tie rods which extend preferably along the diagonals of the quadrilateral.

Preferably, the crossmembers extend in a direction perpendicular to the main direction of extension. Thus, the structure may have a plurality of squares or rectangles distributed along the main direction of extension, each square or rectangle having tie rods which extend preferably along the diagonals of the square or rectangle.

The movable crossmembers are preferably fastened to the longitudinal members by fastening systems such as, for example, screw/nut systems received in oblong holes provided in the longitudinal members. These oblong holes, and in particular appropriate tightening of the screw/nut systems, allow the movement of the movable crossmembers in translation along the main direction of extension with respect to the longitudinal members.

The fixed crossmembers are preferably fastened to the longitudinal members by fastening systems such as, for example, screw/nut systems or rivets received in circular holes provided in the longitudinal members. These circular holes do not allow the crossmembers to move with respect to the longitudinal members.

The lattice structure may be supported by at least two support arches. For example, the lattice structure, and in particular the longitudinal members of the lattice structure, are fastened to the ends of the support arches.

Preferably, the lattice structure has fixed crossmembers at its ends and in the fastening zone of the arches. Thus, the lattice structure may have at least four fixed crossmembers.

The lattice structure may have, between two adjacent fixed crossmembers, at least one quadrilateral having a system for tensioning the tie rods, which is preferably centered with respect to the two adjacent fixed crossmembers.

The lattice structure preferably has, between two adjacent fixed crossmembers that are situated in the fastening zones of the arches, one or more quadrilaterals having a system for tensioning the tie rods.

The lattice structure preferably has, between two adjacent fixed crossmembers that are situated at one end of the structure and in a fastening zone of an arch, a quadrilateral having a system for tensioning the tie rods.

The system for tensioning the tie rods may be any system allowing the tie rods to be tensioned, such as, for example, thread/nut systems at the end of a tie rod, turnbuckles, etc.

The tensioning of the tie rods of the quadrilaterals having a system for tensioning the tie rods makes it possible to drive the movable crossmembers in translation along the main direction of extension and thus makes it possible to stiffen the lattice structure as a whole.

Thus, the lattice structure according to the invention is particularly advantageous since it can be stiffened as a whole by tensioning only the tie rods of the quadrilaterals having a system for tensioning the tie rods. It is thus no longer necessary to tension the tie rods of each quadrilateral of the structure one by one. This makes it possible to significantly reduce the assembly time by reducing the number of tie rod tensioning operations.

After the structure has been stiffened as a whole, the tightening of the fastening, in particular screw/nut, systems of the movable crossmembers on the longitudinal members is continued so that these movable crossmembers can no longer move in translation along the main direction of extension.

The lattice structure may have two, three or four longitudinal members extending parallel to one another along a main direction of extension. The adjacent longitudinal members may be connected in pairs by crossmembers as described above. The adjacent crossmembers connecting two adjacent longitudinal members may be connected together by tie rods as described above.

A further subject of the present invention is a solar tracker having:
- at least one lattice structure having at least two longitudinal members extending parallel to one another along a main direction of extension, a plurality of crossmembers distributed along the main direction of extension in order to connect the longitudinal members together, a plurality of tie rods disposed so as to connect the adjacent crossmembers together, at least some crossmembers being movable in translation in both directions along the main direction of extension with respect to the longitudinal members and at least some crossmembers being fixed with respect to the longitudinal members,
- at least one table supported by the lattice structure, the table being equipped with at least one device for collecting solar energy, the table extending longitudinally along the main direction of extension,
- at least two support arches that are rotatable about an axis of rotation extending along the main direction of extension, the arches being mounted on the lattice structure so as to drive the lattice structure in rotation about the axis of rotation of the arches.

The lattice structure may also have one or more characteristics as defined above.

The table is preferably equipped with a plurality of solar panels in one and the same plane.

The lattice structure is preferably sufficiently rigid to support the table.

The support arches preferably support the lattice structure.

The solar tracker may also have a drive system configured to drive the arches in rotation about the axis of rotation of the arches.

A further subject of the present invention is a solar field having a plurality of solar trackers as defined above.

At least some solar trackers may be disposed parallel to one another, in particular along the North/South direction.

BRIEF DESCRIPTION OF THE DRAWINGS

The invention may be understood better from reading the following detailed description of a nonlimiting implementation example thereof, and from examining the appended drawing, in which:

FIG. 7b shows a detail of the longitudinal member of the lattice structure shown in FIG. 7a.

DETAILED DESCRIPTION

Figure 1:
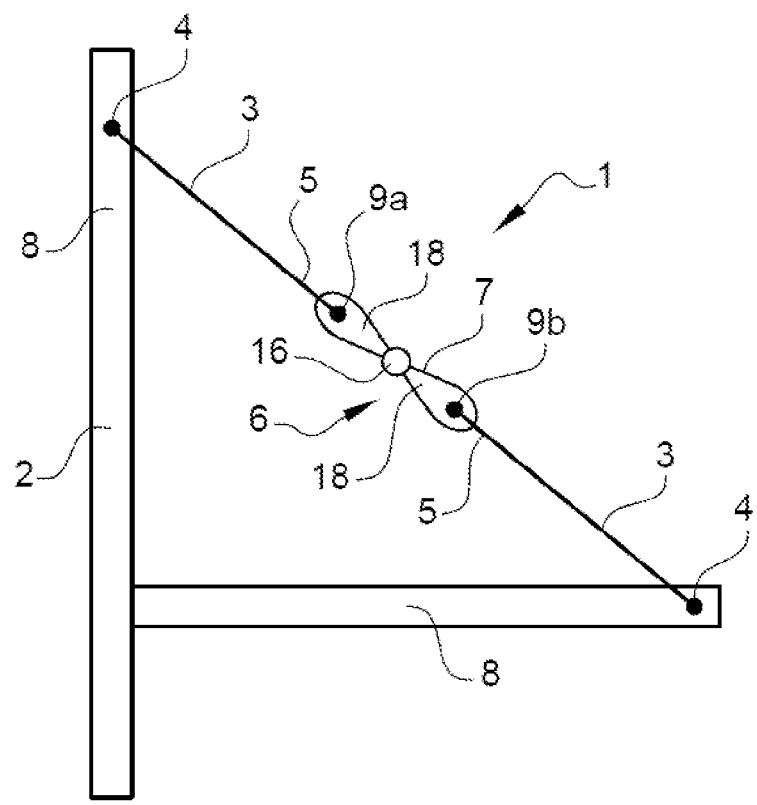
FIG. 1 schematically shows a top view of an example of a system for stiffening a structure according to the invention, FIG. 2a schematically shows a partial, top view of the stiffening system in FIG. 1, in which the linking element is in an inactive configuration, FIG. 2b schematically shows a partial, top view of the stiffening system in FIG. 1, in which the linking element is in an active configuration, FIG. 3a schematically shows an example of a device for tensioning the tie rods according to the invention, in which the linking element is in an inactive configuration, FIG. 3b schematically shows the device for tensioning the tie rods that is shown in FIG. 3a, in which the linking element is in an active configuration, FIG. 4a schematically shows a perspective view of another example of a system for stiffening a structure according to the invention, FIG. 4b schematically shows another perspective view of the system for stiffening a structure that is shown in FIG. 4a, FIG. 4c schematically shows another perspective view of the system for stiffening a structure that is shown in FIGS. 4a and 4b, in which the actuator and the linking element are shown in cross section, FIG. 4d schematically shows a perspective view of the device for tensioning the tie rods of the system for stiffening a structure that is shown in FIGS. 4a, 4b and 4c, in which the linking element is in an active configuration, FIG. 5 schematically shows a top view of an example of a lattice structure according to the invention, FIG. 6a schematically shows a perspective view of a detail of the lattice structure shown in FIG. 5, FIG. 6b schematically shows a perspective view of a detail of the longitudinal member of the lattice structure shown in FIG. 6a, FIG. 7a schematically shows a perspective view of another detail of the lattice structure shown in FIG. 5.

FIG. 1 illustrates an example of a system 1 for stiffening a structure 2 according to the invention. In this example, the structure 2 has two perpendicular walls 8.

The system 1 has, in this example, a pair of tie rods 3, each tie rod 3 of the pair of tie rods 3 having a first end 4 fastened to the structure 2 and a second end 5. The tie rods 3 lie in the continuation of one another and are aligned.

The system 1 also has a device 6 for tensioning the tie rods 3, having a deformable linking element 7 fastened to the second end 5 of each tie rod 3 so as to connect the tie rods 3 together.

One of the tie rods 3 of the pair of tie rods 3 is fastened by its second end 5 at a first fastening point 9a of the linking element 7, and the other tie rod 3 of the pair of tie rods 3 is fastened by its second end 5 at a second fastening point 9b of the linking element 7.

The linking element 7 is able to deform so as to pass from an inactive configuration in which the tie rods 3 are in a first state of tension to an active configuration in which the tie rods 3 are in a second state of tension, different than the first state of tension.

Figure 2A:
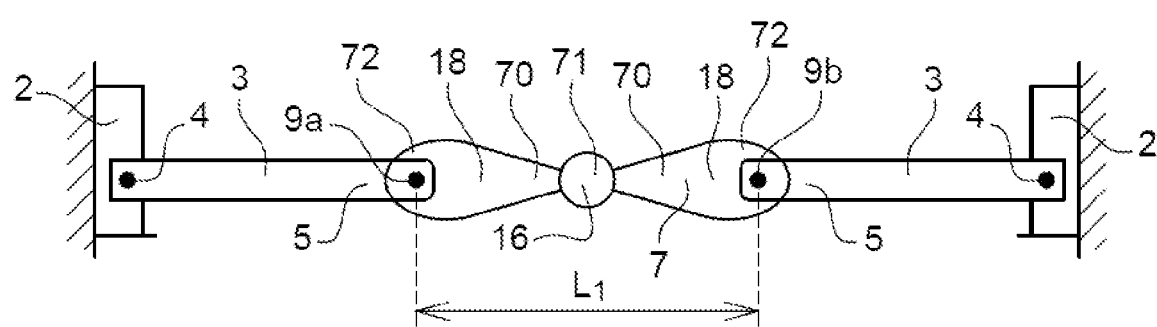

FIG. 2a illustrates the linking element 7 in an inactive configuration in which the tie rods 3 are in a first state of tension. In this inactive configuration, the linking element 7 is not deformed and the tie rods 3 are not tensioned. The first 9a and second 9b fastening points are separated by a distance $L_1$.

Figure 2B:
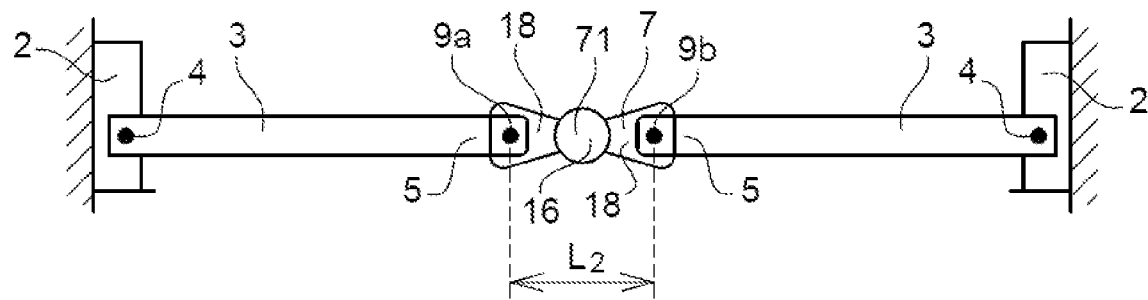

FIG. 2b illustrates the linking element 7 in an active configuration in which the tie rods 3 are in a second state of tension.

In this active configuration, the linking element 7 is deformed and the tie rods 3 are tensioned. The first 9a and second 9b fastening points are separated by a distance $L_2$, where $L_2 < L_1$.

Thus, in this second state of tension, the tensile load in the tie rods 3 is greater than in the first state of tension.

Figure 3A:
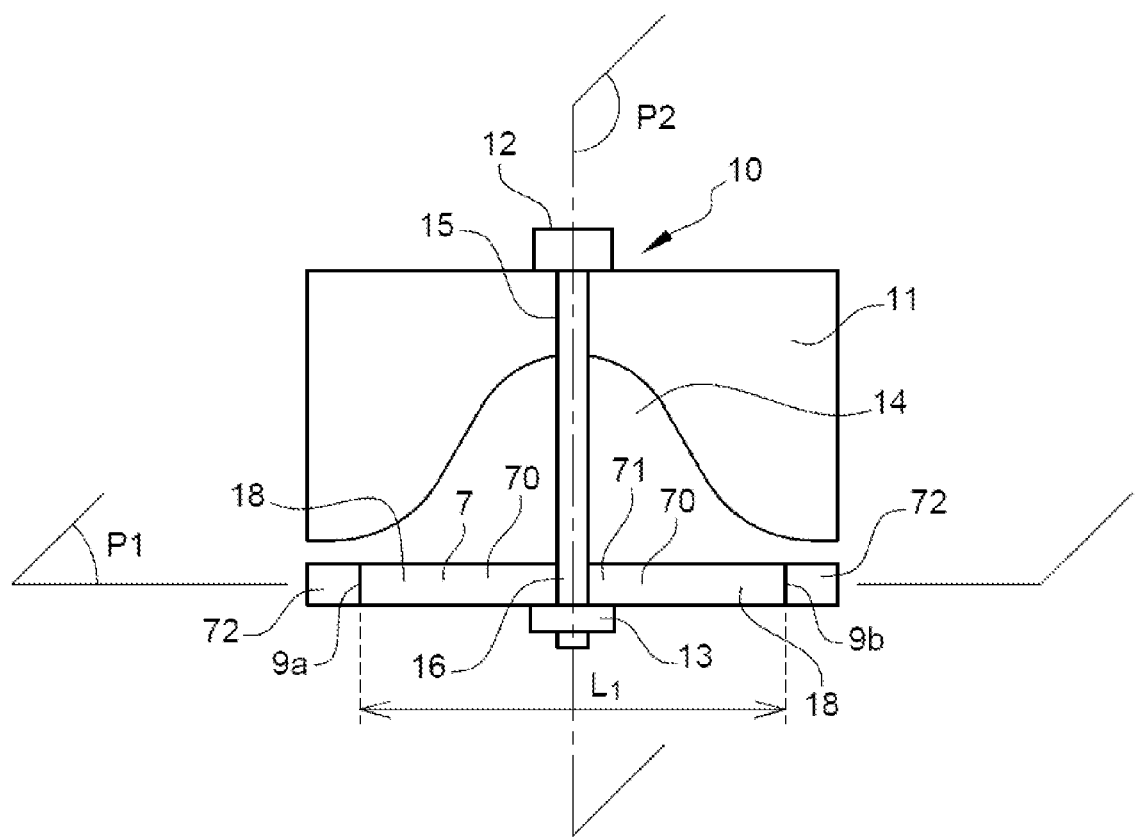
Figure 3B:
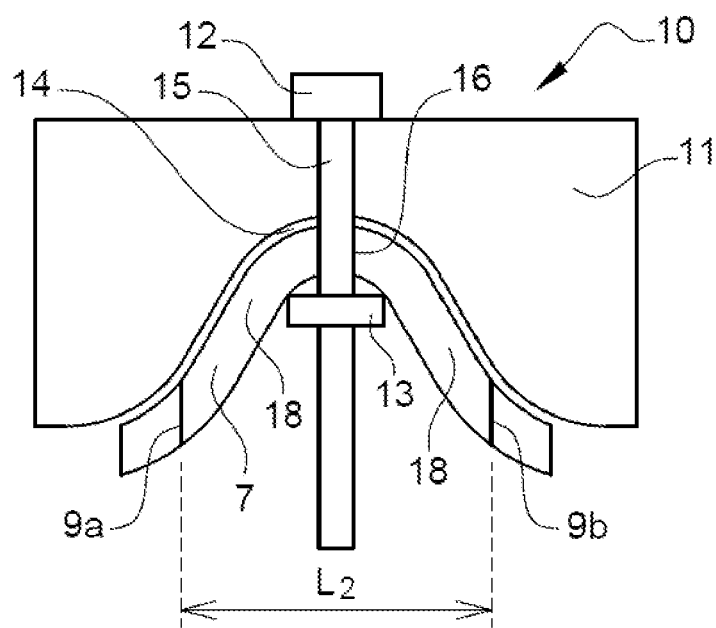

FIGS. 3a and 3b illustrate an actuator 10 configured to deform the linking element 7 so as to make it pass from an inactive configuration (FIG. 3a) to an active configuration (FIG. 3b).

The linking element 7 extends in a first plane P1 and is deformable in a second plane P2, perpendicular to the first plane P1.

The actuator 10 has a tightening support 11 on which the linking element 7 comes to bear. The tightening support 11 has a concavity 14 oriented toward the linking element 7.

The tightening support 11 has an orifice 15 at the apex of the concavity 14.

The linking element for its part has an orifice 16 situated next to the orifice 15 in the tightening support 11.

The actuator also has a tightening-screw 12/nut 13 assembly, and the orifices 15, 16 in the tightening support 11 and in the linking element 7 receive said tightening-screw 12/nut 13 assembly.

During the tightening of the tightening-screw 12/nut 13 assembly, the linking element 7 deforms, conforming to the shape of the concavity 14 of the tightening support 11, as illustrated in FIG. 3b. This shortens the distance between the first 9a and second 9b fastening points of the linking element and thus tensions the tie rods 3.

In this example, the actuator 10 is removable, meaning that it serves to deform the linking element 7 so as to take it from the inactive configuration to the active configuration and then can be detached from the linking element 7 following deformation.

FIGS. 4a to 4d illustrate another example of a system 1 for stiffening a structure 2 according to the invention.

The linking element 7 extends in a first plane P1 and is deformable in a second plane P2, perpendicular to the first plane P1.

Each tie rod 3 of the pair of tie rods 3 extends in the same plane as the linking element 7 or in a parallel plane.

In this example, the system 1 has two pairs of tie rods 3, each tie rod 3 having a first end 4 (not shown) fastened to the structure 2 and a second end 5 fastened to the linking element 7.

In this example, the actuator 10 is not removable. It is fastened both to the tie rods 3 and to the linking element 7.

Figure 4A:
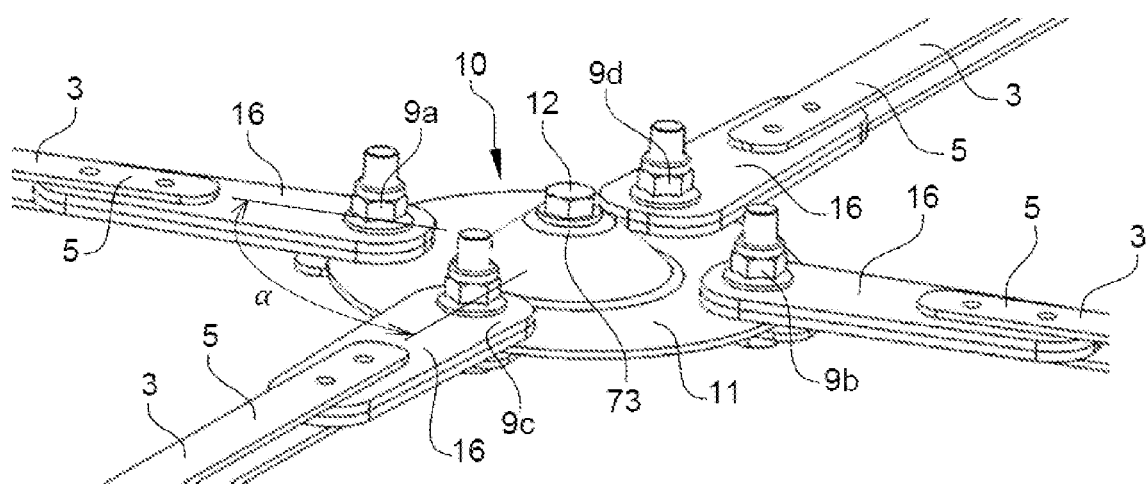
Figure 4B:
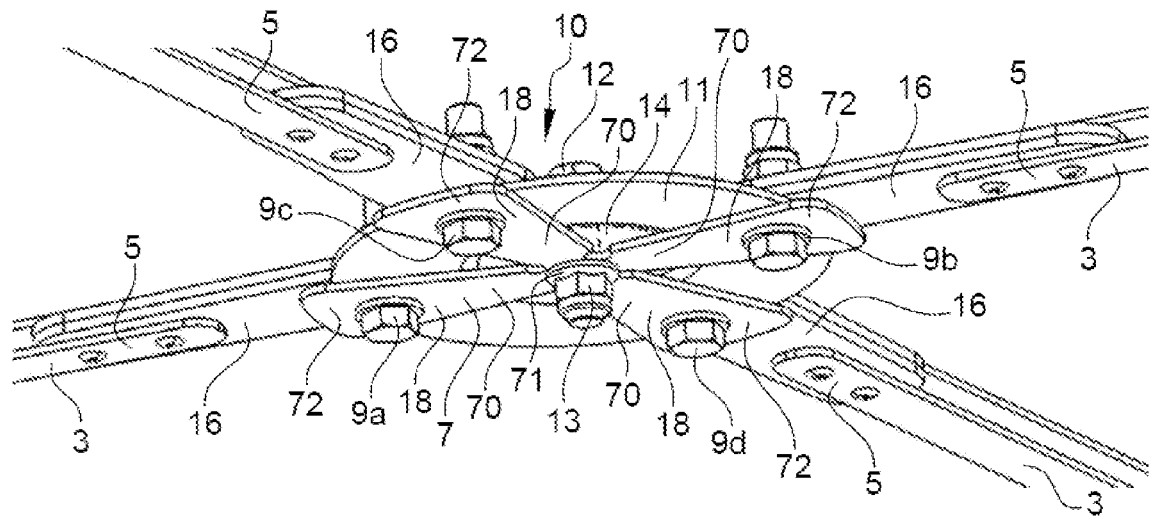
Figure 4C:
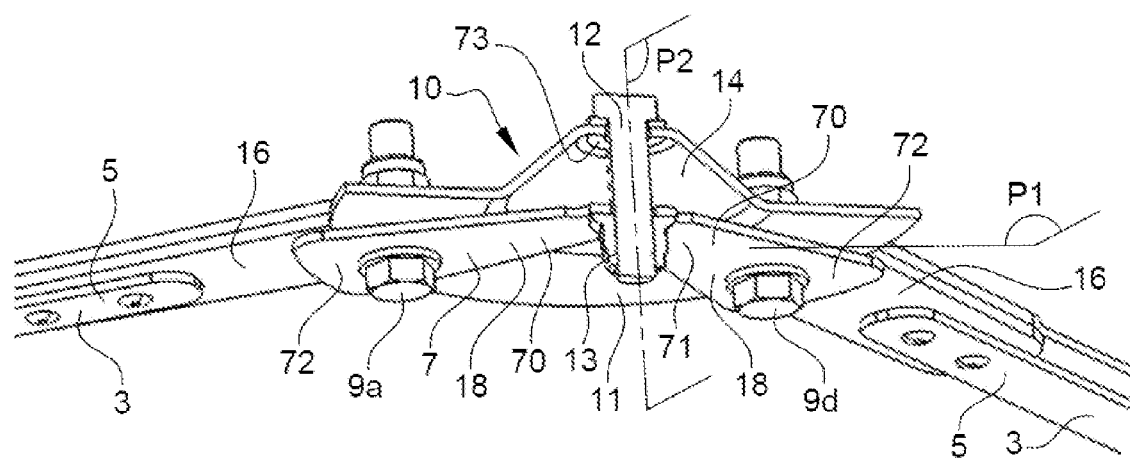
Figure 4D:
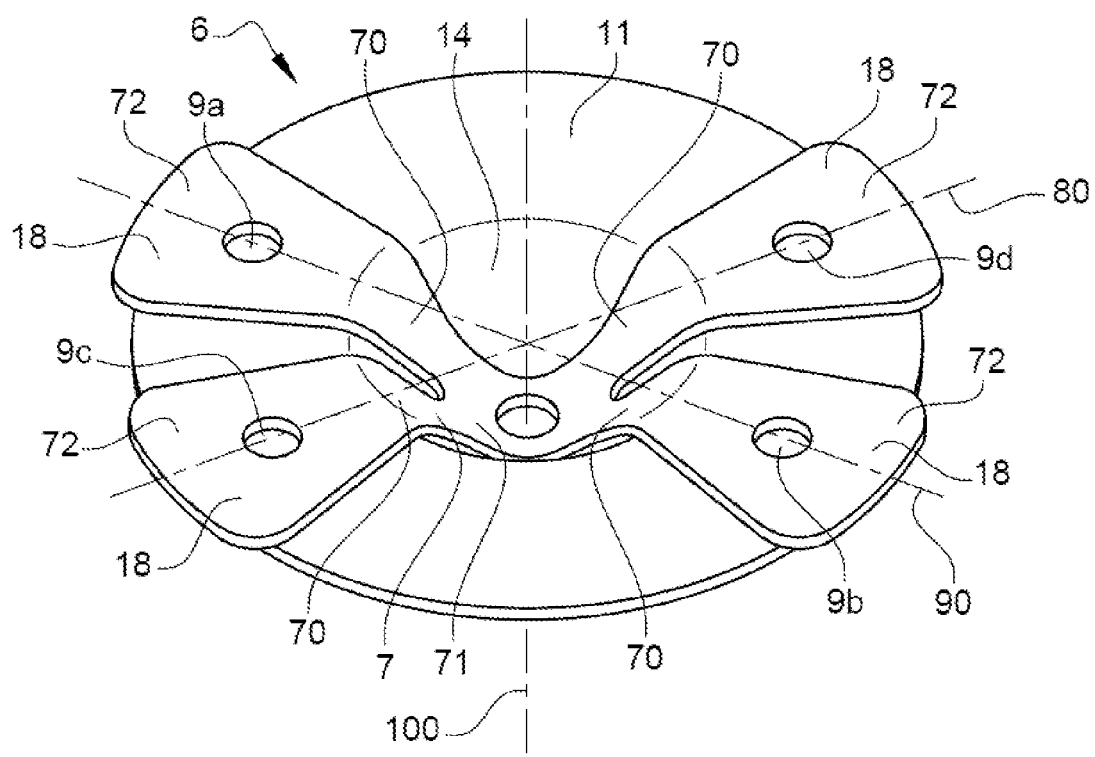

FIGS. 4a to 4c illustrate the device 6 for tensioning the tie rods 3 with the linking element 7 in its inactive configuration (i.e. prior to deformation) and FIG. 4d illustrates the device 6 with the linking element 7 in its active configuration (i.e. following deformation).

The tie rods 3 of each pair of tie rods 3 are disposed in a star shape around the linking element 7.

Each pair of tie rods 3 has two aligned tie rods 3.

The angle $\alpha$ between two adjacent tie rods is greater than or equal to 40° and less than or equal to 140°.

The second end 5 of each tie rod 3 is continued by a mounting plate 16 to which the tie rod 3 is fastened by riveting. The mounting plate 16 is for its part fastened both to the tightening support 11 and to the linking element 7 by a screw/nut system. The use of such a mounting plate 16 for connecting the second end 5 of a tie rod 3 both to the tightening support 11 and to the linking element 7 is optional. Specifically, it is possible to fasten the second end 5 of each tie rod 3 directly to the tightening support 11 and to the linking element 7.

The tightening support 11 is sandwiched between the tie rods 3 and the linking element 7.

The tightening support 11 is in the form of a plate having at its center 73 a concavity 14 oriented toward the linking element 7. The concavity 14 may have a parabolic, hyperbolic or elliptical shape.

The tightening support 11 has orifices for fastening it to the mounting plates 16 and to the linking element by the screw/nut system. These orifices have an oblong shape so as to allow the tie rods to move toward the center 73 of the tightening support 11.

The linking element 7 has two pairs of arms 18.

The arms 18 are disposed in a star shape around the center 71 of the linking element 7.

Each arm 18 of the linking element 7 is fastened to the second end 5 of a tie rod 3.

Each arm 18 extends along the longitudinal axis of the tie rod 3 to which it is fastened or along an axis which extends with a slight deviation, for example of around plus or minus 10°, with respect to the longitudinal axis of the tie rod 3 to which it is fastened.

Preferably, each arm 18 extends along the longitudinal axis of the tie rod 3 to which it is fastened.

The tightening of the tightening-screw 12/nut 13 assembly of the actuator 10 makes it possible to deform the linking element 7 and therefore to tension the set of tie rods 3.

In FIG. 4d, which illustrates the device 6 with the linking element 7 in its active configuration (i.e. following deformation), each pair of arms 18 of the linking element 7 extends along a longitudinal axis 80, 90. The longitudinal axes 80, 90 are in the plane P1 in which the linking element 7 extends. The linking element 7 is deformed along a longitudinal axis 100 which is perpendicular to the axes 80, 90.

Figure 5:
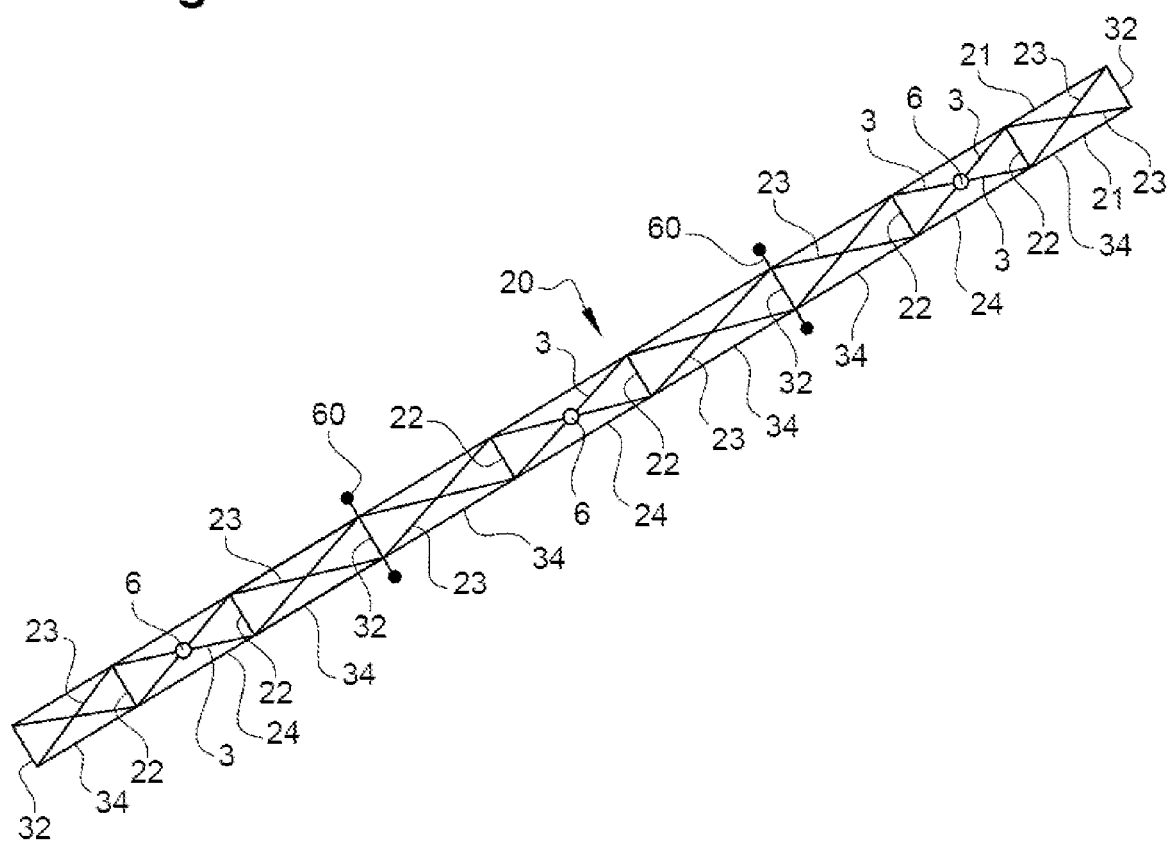

FIG. 5 illustrates an example of a lattice structure 20 according to the invention.

The structure 20 has:
- at least two longitudinal members 21 extending parallel to one another along a main direction of extension,
- a plurality of crossmembers 22, 32 distributed along the main direction of extension in order to connect the longitudinal members 21 together, the crossmembers 22, 32 extending in a direction perpendicular to the main direction of extension and being parallel to one another,
- a plurality of tie rods 3, 23 disposed so as to connect the adjacent crossmembers 22, 32 together.

The structure 20 has at least two adjacent crossmembers 22, 32 having, between one another, the stiffening system 1 according to the invention, that is to say at least two adjacent crossmembers 22, 32 between which the tie rods are tensioned with the aid of the tensioning device 6 according to the invention.

The structure 20 forms a rectangle 24, 34 between two adjacent crossmembers. The rectangle 24, 34 may have two opposite sides corresponding to two adjacent crossmembers 22, 32 and two opposite sides corresponding to the portions of longitudinal members 21 extending between said adjacent crossmembers 22, 32.

The tie rods 3, 23 connecting two adjacent crossmembers 22, 32 extend along the direction of the diagonals of the rectangle 24, 34.

The structure 20 thus has a plurality of rectangles 24, 34 distributed along the main direction of extension, each rectangle 24, 34 having tie rods 3, 23 which extend along the diagonals of the rectangle 24, 34.

The structure has crossmembers 22 that are movable in translation in both directions along the main direction of extension and crossmembers 32 that are fixed.

Figure 6A:
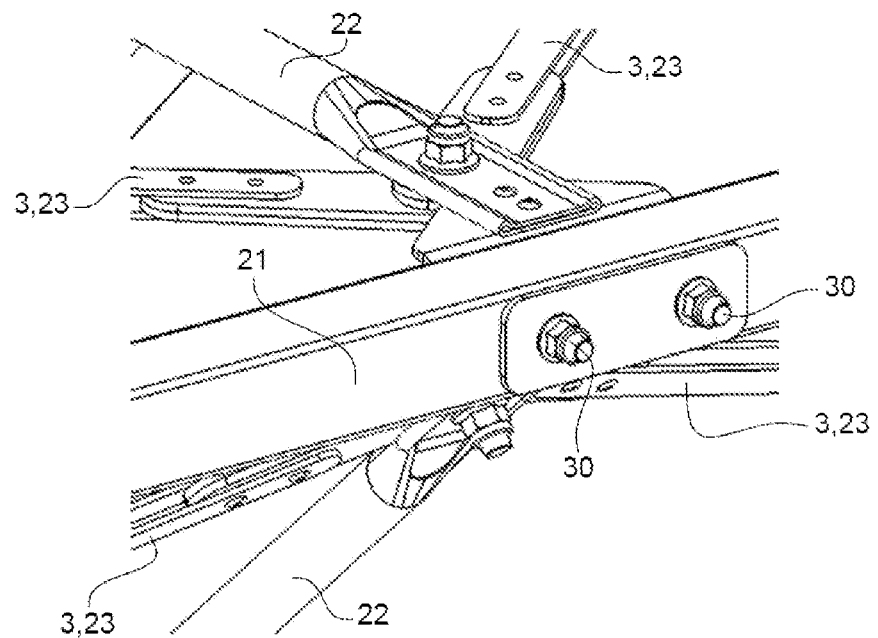
Figure 6B:
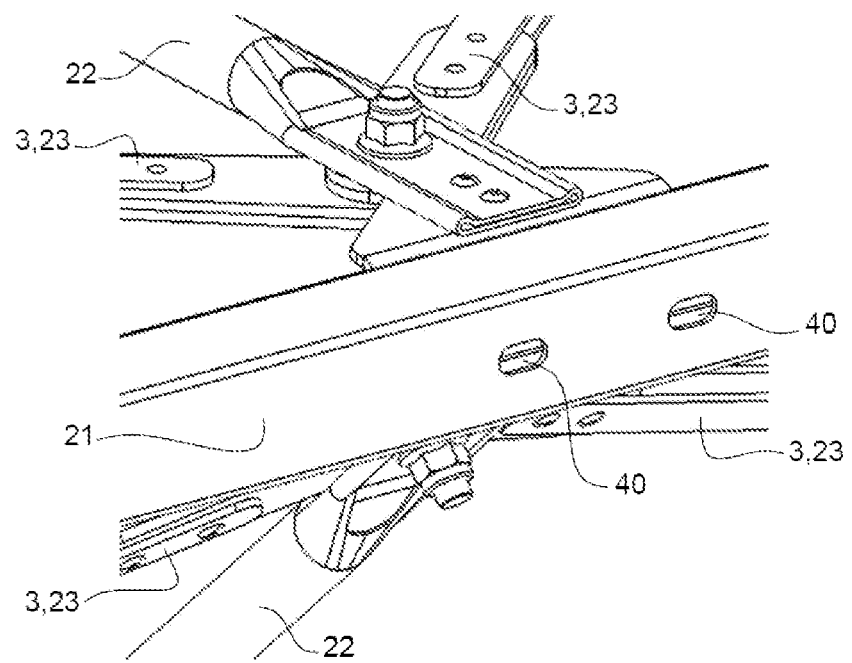

As illustrated in FIGS. 6a and 6b, the movable crossmembers 22 are fastened to the longitudinal members 21 by fastening systems such as, for example, screw/nut systems 30 received in oblong holes 40 provided in the longitudinal members 21. These oblong holes 40, and in particular appropriate tightening of the screw/nut systems 30, allow the movement of the movable crossmembers 22 in translation along the main direction of extension with respect to the longitudinal members 21. Thus, before the tie rods are tensioned, the tightening of the screw/nut systems 30 is such that it allows the movement of the movable crossmembers 22 in translation along the main direction of extension with respect to the longitudinal members 21.

Figure 7A:
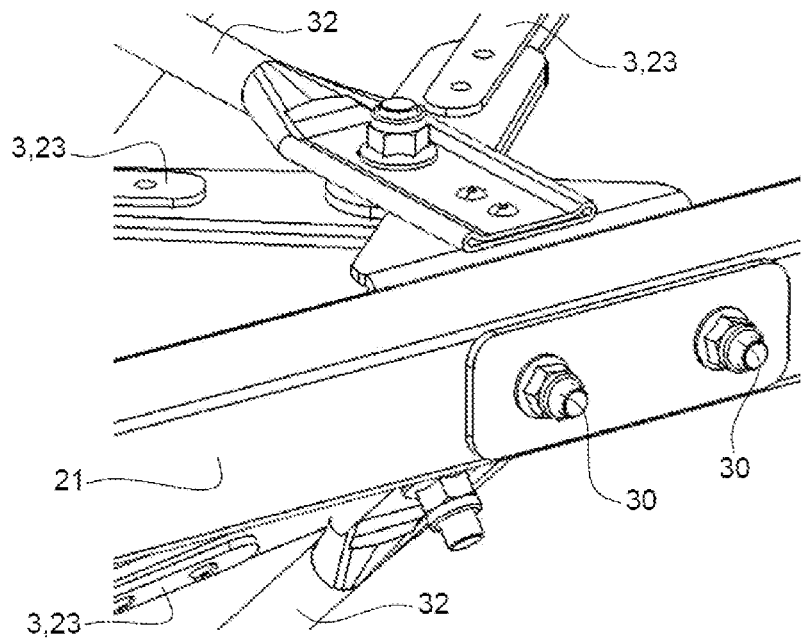
Figure 7B:
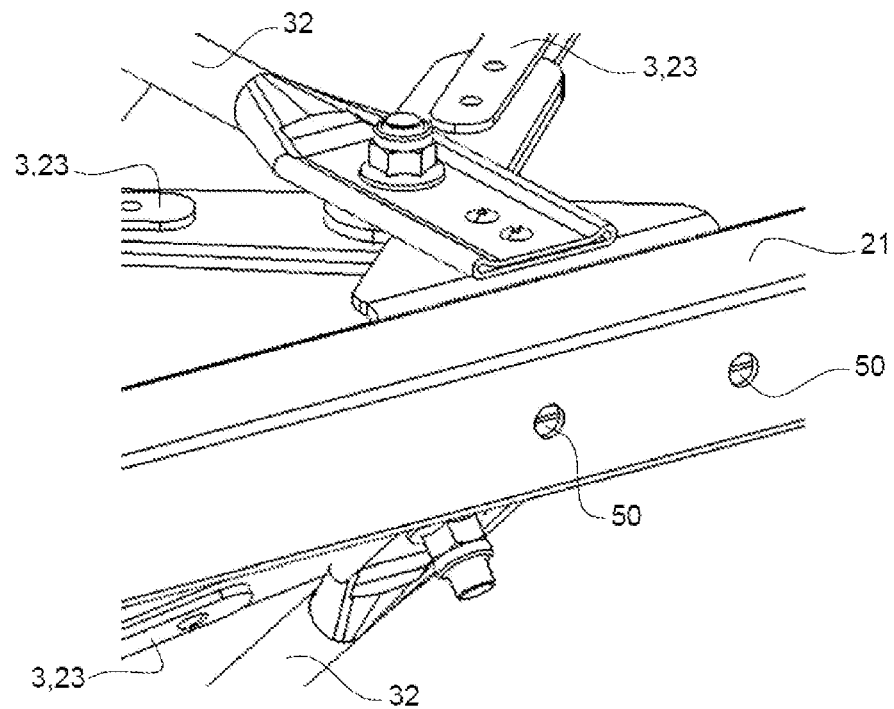

As illustrated in FIGS. 7a and 7b, the fixed crossmembers 32 are fastened to the longitudinal members 21 by fastening systems such as, for example, screw/nut systems 30 received in circular holes 50 provided in the longitudinal members 21. These circular holes 50 do not allow the crossmembers 32 to move with respect to the longitudinal members 21.

Further fastening systems may be used to fasten the fixed crossmembers 32 to the longitudinal members 21, such as rivets (not shown), for example.

The lattice structure 20 may be supported by at least two support arches 60. For example, the lattice structure 20, and in particular the longitudinal members 21 of the lattice structure 20, are fastened to the ends of the support arches 60.

The lattice structure 20 has fixed crossmembers 32 at its ends and in the fastening zone of the arches. Thus, the lattice structure has at least four fixed crossmembers 32.

The lattice structure 20 has, between two adjacent fixed crossmembers 32, at least one rectangle 24 in which the tie rods 3 are tensioned with the aid of the tensioning device 6 according to the invention, which is preferably centered with respect to the two adjacent fixed crossmembers 32.

The tensioning of the tie rods of the rectangles 24 in which the tie rods 3 are tensioned with the aid of the tensioning device 6 according to the invention makes it possible to drive the movable crossmembers 22 in translation along the main direction of extension and thus makes it possible to stiffen the lattice structure 20 as a whole.

Thus, after the tie rods 3 of the rectangles 24 have been tensioned, the lattice structure 20 as a whole is stiffened. It is thus possible to retighten the screw/nut systems 30 received in the oblong holes 40 provided in the longitudinal members 21 so as to prevent the movement of the movable crossmembers 22 in translation along the main direction of extension with respect to the longitudinal members 21.

The invention claimed is:

1. A stiffening system of tie rods for stiffening a structure, comprising:
   at least one pair of tie rods, each tie rod of the pair of tie rods having a first end fastened to the structure and a second end,
   at least one device for tensioning the tie rods, having:
      a deformable linking element fastened to the second end of each tie rod so as to connect the tie rods,
      an actuator configured to deform the linking element so as to make the linking element to pass from an inactive configuration in which the tie rods are in a first state of tension to an active configuration in which the tie rods are in a second state of tension, different than the first state of tension.

2. The stiffening system as claimed in claim 1, wherein the second state of tension is a state of tensile loading of the tie rods.

3. The stiffening system as claimed in claim 2, wherein the tensile load in the tie rods is greater in the second state of tension than in the first state of tension.

4. The stiffening system as claimed in claim 1, wherein one of the tie rods of the pair of tie rods is fastened by its second end at a first fastening point of the linking element, and the other tie rod of the pair of tie rods is fastened by its second end at a second fastening point of the linking element.

5. The stiffening system as claimed in claim 4, wherein the deformation of the linking element as it passes from the inactive configuration to the active configuration shortens the distance between the first and second fastening points of the linking element, this distance being measured along a straight line passing through the first and second fastening points of the linking element.

6. The stiffening system as claimed in claim 4, wherein the linking element has a pair of arms, one of the arms having a proximal end connected to the center of the linking element and a distal end having the first fastening point, and the other arm having a proximal end connected to the center of the linking element and a distal end having the second fastening point.

7. The stiffening system as claimed in claim 6, wherein the arms of the pair of arms of the linking element are aligned.

8. The stiffening system as claimed in claim 1, wherein the actuator is configured to deform the linking element by tightening the linking element against the actuator.

9. The stiffening system as claimed in claim 1, wherein the linking element extends in a first plane and is deformable in a second plane, perpendicular to the first plane.

10. The stiffening system as claimed in claim 1, wherein each tie rod of the pair of tie rods extends in the same plane as the linking element or in a parallel plane.

11. The stiffening system as claimed in claim 1, wherein the tie rods of the pair of tie rods are rigid.

12. The stiffening system as claimed in claim 1, wherein the tie rods of the pair of tie rods lie in the continuation of one another.

13. The stiffening system as claimed in claim 1, wherein the tie rods of the pair of tie rods are aligned.

14. The stiffening system as claimed in claim 1, wherein the actuator has a tightening support and is configured to deform the linking element via tightening, preferably by screwing, the linking element in contact with the tightening support.

15. The stiffening system as claimed in claim 1, which has at least two pairs of tie rods, the tie rods preferably being disposed in a star shape around the linking element.

16. The stiffening system as claimed in claim 15, wherein the linking element has at least two pairs of arms, the arms preferably being disposed in a star shape around the center of the linking element.

17. The stiffening system as claimed in claim 1, wherein the structure is a supporting structure, in particular a lattice structure.

18. A method for stiffening a structure with the aid of a stiffening system as defined in claim 1, said method comprising the steps of:
applying a predetermined deformation force to the linking element with the aid of the actuator so as to deform the linking element in a controlled manner and thus to make it pass from an inactive configuration in which the tie rods are in a first state of tension to an active configuration in which the tie rods are in a second predetermined state of tension, different than the first state of tension.

19. A lattice structure comprising:
at least two longitudinal members extending parallel to one another along a main direction of extension,
a plurality of crossmembers distributed along the main direction of extension in order to connect the longitudinal members together,
a plurality of tie rods disposed so as to connect the adjacent crossmembers together, at least two adjacent crossmembers having, between one another, a stiffening system as claimed in claim 1.

20. The lattice structure as claimed in claim 19, wherein at least some crossmembers are movable in translation in both directions along the main direction of extension with respect to the longitudinal members and at least some crossmembers are fixed with respect to the longitudinal members.

21. A solar tracker comprising:
at least one lattice structure as claimed in claim 19, in particular a lattice beam, extending longitudinally along a main direction of extension,
at least one table supported by the lattice structure, the table being equipped with at least one device for collecting solar energy, the table extending longitudinally along the main direction of extension,
at least two support arches that are rotatable about an axis of rotation extending along the main direction of extension, the arches being mounted on the lattice structure so as to drive the lattice structure in rotation about the axis of rotation of the arches.

22. A solar field having a plurality of solar trackers as claimed in claim 21, wherein at least some solar trackers are preferably disposed parallel to one another, in particular along the North/South direction.

\* \* \* \* \*